US012608643B2

(12) United States Patent
Kwatra et al.

(10) Patent No.: US 12,608,643 B2
(45) Date of Patent: Apr. 21, 2026

(54) GENERATING WORKFLOW REPRESENTATIONS USING REINFORCED FEEDBACK ANALYSIS

(71) Applicant: International Business Machines Corporation, Armonk, NY (US)

(72) Inventors: Shikhar Kwatra, San Jose, CA (US); Indervir Singh Banipal, Austin, TX (US); Nadiya Kochura, Bolton, MA (US); Sourav Mazumder, Contra Costa, CA (US)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 17/473,957

(22) Filed: Sep. 13, 2021

(65) Prior Publication Data

US 2023/0080417 A1 Mar. 16, 2023

(51) Int. Cl.
| | |
|---|---|
| *G06F 40/30* | (2020.01) |
| *G06F 16/901* | (2019.01) |
| *G06F 18/21* | (2023.01) |
| *G06F 18/214* | (2023.01) |
| *G06F 18/2321* | (2023.01) |
| *G06N 3/045* | (2023.01) |
| *G06N 3/0475* | (2023.01) |
| *G06N 3/084* | (2023.01) |

(Continued)

(52) U.S. Cl.
CPC ......... *G06N 20/00* (2019.01); *G06F 16/9024* (2019.01); *G06F 18/214* (2023.01); *G06F 18/217* (2023.01); *G06F 18/2321* (2023.01); *G06F 40/30* (2020.01)

(58) Field of Classification Search
CPC ..... G06N 20/00; G06F 16/9024; G06F 40/30; G06F 18/217; G06F 18/214; G06F 18/2321
See application file for complete search history.

(56) References Cited

U.S. PATENT DOCUMENTS

| | | |
|---|---|---|
| 8,744,890 B1 | 6/2014 | Bernier |
| 10,395,181 B2 | 8/2019 | Bowers |

(Continued)

FOREIGN PATENT DOCUMENTS

| | | |
|---|---|---|
| AU | 2014200965 B2 | 3/2018 |
| CA | 2864113 C | 11/2015 |

(Continued)

OTHER PUBLICATIONS

Srinivasan, Arjun, et al. "Discovering natural language commands in multimodal interfaces." proceedings of the 24th international conference on intelligent user interfaces. 2019. (Year: 2019).*
"Disconnected installation", RedHat OpenShift, Copyright © 2021 Red Hat, Inc., 13 pps., <https://docs.openshift.com/container-platform/3.11/install/disconnected_install.html>.
"How to build apps with natural language processing", IBM, downloaded from the Internet on Sep. 9, 2021, 3 pps., <https://www.ibm.com/watson/natural-language-processing>.

(Continued)

*Primary Examiner* — Abdullah Al Kawsar
*Assistant Examiner* — Gary Mac
(74) *Attorney, Agent, or Firm* — David K. Mattheis

(57) ABSTRACT

Generating visual workflow representations by receiving data including text instructions, identifying actions in the instructions, generating a mapping of the actions according to a generative model, the mapping including an action sequence, providing the mapping to a user, receiving feedback from the user, altering the generative model according to the feedback, and generating a revised mapping according to the feedback.

6 Claims, 4 Drawing Sheets

(51) Int. Cl.

| | |
|---|---|
| *G06N 3/092* | (2023.01) |
| *G06N 3/094* | (2023.01) |
| *G06N 20/00* | (2019.01) |

(56) References Cited

U.S. PATENT DOCUMENTS

| | | | | |
|---|---|---|---|---|
| 2005/0262112 | A1 | 11/2005 | Moore | |
| 2018/0165604 | A1 | 6/2018 | Minkin | |
| 2020/0302231 | A1* | 9/2020 | Nawhal | G06F 18/211 |
| 2021/0065006 | A1 | 3/2021 | Bade | |
| 2021/0097120 | A1 | 4/2021 | Gutierrez | |
| 2021/0382712 | A1* | 12/2021 | Richman | G06N 20/00 |

FOREIGN PATENT DOCUMENTS

| | | | |
|---|---|---|---|
| JP | 63277723 | A | 11/1988 |
| WO | 2020176908 | A1 | 9/2020 |

OTHER PUBLICATIONS

"Installing Cloud Pak for Data on managed Red Hat OpenShift on IBM Cloud", IBM, © Copyright IBM Corporation 2018, 2019, 1 pp., <https://www.ibm.com/support/knowledgecenter/SSQNUZ_2.1.0/com.ibm.icpdata.doc/zen/install/openshift-softlayer.html>.

"SystemT", IBM, last updated Feb. 12, 2021, 4 pps., https://researcher.watson.ibm.com/researcher/view_group.php?id=1264.

Betancourt, "A Conceptual Introduction to Hamiltonian Monte Carlo", arXiv:1701.02434v2 [stat.ME] Jul. 16, 2018, 60 pps., <https://arxiv.org/pdf/1701.02434.pdf>.

Ekambaraml, "cpd25-on-openshift-airgap", © 2021 GitHub, Inc., 2 pps., <https://github.com/ekambaraml/cpd25-on-openshift-airgap/blob/master/inventory.template-cri-o>.

Mell et al., "The NIST Definition of Cloud Computing", National Institute of Standards and Technology, U.S. Department of Commerce, NIST Special Publication 800-145, Sep. 2011, 7 pages.

* cited by examiner

NETWORKED COMPUTER SYSTEM, 1000

CLIENT, 104

NETWORK 114

CLIENT, 110

SERVER SUB-SYSTEM, 102

SERVER COMPUTER, 150

COMMUNICATIONS UNIT, 152

MEMORY, 158

RAM, 160

PERSISTENT STORAGE, 170

PROCESSOR SET, 154

CACHE, 162

PROGRAM, 175

I/O INTERFACE SET, 156

140

DISPLAY, 180

EXTERNAL DEVICES, 190

GENERATING WORKFLOW REPRESENTATIONS USING REINFORCED FEEDBACK ANALYSIS

BACKGROUND

The disclosure relates generally to the machine learning-based generation of graphical workflow representations. The disclosure relates particularly to machine learning-based generation of graphical workflow representations through reinforced feedback analysis.

Complex tasks typically include many steps for completion. Supporting documentation for such complex tasks may be equally complex. The supporting documentation includes data regarding the action necessary for completion of the overall complex tasks.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable generation of visual workflow representations using reinforced feedback analysis.

Aspects of the invention disclose methods, systems and computer readable media associated with generating visual workflow representations by receiving data including text instructions, identifying actions in the instructions, generating a mapping of the actions, the mapping including an action sequence, providing the mapping to a user, receiving feedback from the user, altering the generative model according to the feedback, and generating a revised mapping according to the feedback.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
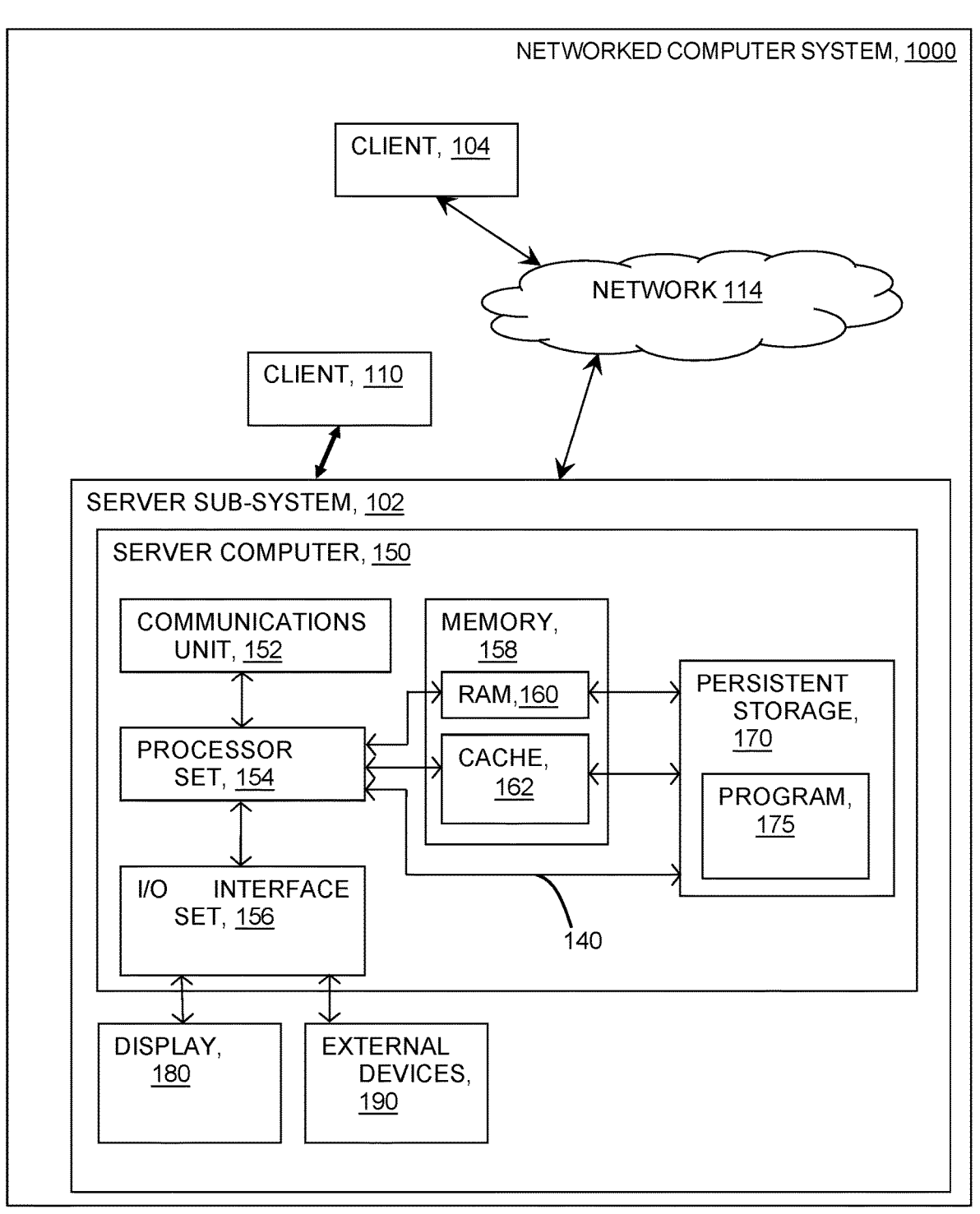
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Supporting documentation for complex tasks, such as the installation of a complex computer program on a platform architecture, may be lengthy, hard to understand and though they may include all the necessary details, those details may not be presented in a manner enabling a user to understand the relationship between components and the installation tasks or the complete picture of the installation process. Details such as the time necessary for process steps, step sequences and dependencies may be difficult for a user to discern from the documentation or to communicate coherently to others. Disclosed embodiments provide visual depictions of complex workflows by extracting necessary data from provided documentation, generating graphical depictions of the underlying workflows, and revising the generated depictions using user supported reinforcement learning to alter the generative model.

Aspects of the present invention relate generally to the generation of visual, or graphical, depictions of workflows. Embodiments relate specifically to iteratively generating such depictions using generative models revised through human-in-the-loop reinforcement learning algorithms. In embodiments, workflow generating system receives documentation associated with the workflow tasks, returns the generated graphical workflow, including command line interface links for the necessary tasks, and arranges the workflow graphical elements to provide a user with the complete workflow picture. According to aspects of the invention, the workflow generation system dynamically adjusts the graphical depiction according to reinforcement learning using user provided feedback on iteration of the depiction. In this manner, implementations of the invention learn and continually adjust workflow generation such that the workflow generation system returns depictions tailored to the preferences of a user, and continually update the generating model according to the user's feedback on provided results.

In accordance with aspects of the invention there is a method for automatically adjusting a workflow depiction using a generative model altered according to user feedback. The method comprising: receiving a data associated with the workflow; identifying entities and intents (actions) from the data, generating a mapping of the entities and action using a generative model, providing the generated model to a user of the workflow, receiving feedback from the user regarding aspects of the depicted workflow, altering the generative model according to the received feedback, and generating a new depiction using the generative model altered using reinforcement learning and the user feedback.

Aspects of the invention provide an improvement in the technical field of workflow depiction systems. Conventional systems utilize static models to depict data extracted from an input corpus. In many cases, the input data is not structured data and the resulting output does not include a complete depiction of the steps of the workflow in a useful manner. As a result, the static confidence model output often only a guess that may or may not produce satisfactory results. Implementations of the invention leverage user knowledge and preferences and reinforcement learning to alter the generative model and the workflow depiction output. This provides the improvement of achieving a complete, usable, depiction of the workflow for the user.

Aspects of the invention also provide an improvement to computer functionality. In particular, implementations of the invention are directed to a specific improvement to the way generative models operate, embodied in the continually adjusted generative model through reinforcement learning according to user feedback on generated results. In embodiments, the system adjusts the generative model, such that each generated workflow depiction more closely resembles a depiction preferred by the user. As a result of adjusting the generative model using user feedback-based reinforcement learning, the system provides increasingly refined depictions of the workflow, tailored to a user's preferences. In this manner, embodiments of the invention affect how the depiction system functions (i.e., the likelihood of providing a desired and preferred workflow depiction).

As an overview, disclosed depiction systems include an artificial intelligence application executed on data processing hardware that extracts entity and action information from input data pertaining to a given subject-matter domain presented in natural language—workflow task documentation. The depiction system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the depiction system. The document may include any file, text, article, or source of data for use in the depiction system. For example, a depiction system accesses a body of knowledge about the domain, or subject matter area (e.g., different program products and system platforms, etc.) where the body of knowledge (knowledgebase) can be organized in a variety of configurations, such as but not limited to a structured repository of domain-specific information, such as ontologies, or unstructured data related to the domain, or a collection of natural language documents about the domain. The depiction system provides the extracted data as input to a generative model which yields a graphical depiction of the relationships found in the extracted data. User feedback on depictions serves as input for reinforcement learning based alterations to the generative model leading to successive generations of increasing refined depictions of the workflow for the user.

In an embodiment, one or more components of the system can employ hardware and/or software to solve problems that are highly technical in nature (e.g., receiving data including text instructions, identifying actions in the instructions, generating a mapping of the actions, the mapping including an action sequence according to a generative model, providing the mapping to a user, receiving feedback from the user, altering the generative model according to the feedback, generating a revised mapping according to the feedback, etc.). These solutions are not abstract and cannot be performed as a set of mental acts by a human due to the processing capabilities needed to facilitate workflow depiction generation, for example. Further, some of the processes performed may be performed by a specialized computer for carrying out defined tasks related to depicting workflows. For example, a specialized computer can be employed to carry out tasks related to generating workflow depictions, or the like.

In an embodiment, the method receives input data associated with the target workflow. The input data may include text and image data, such as system and program installation documentation, user inputs such as textual comments and requests, as well as spoken comments captured with the user's permission using system microphones, analog to digital software and speech to text software. In this embodiment, the method process all received input data using natural language understanding (NLU) or similar algorithms to extract entities and entity actions from the data.

Disclosed embodiments can perform natural language processing for extraction of NLU output parameter values from received input data, as well as response data from a user to initial system outputs. NLU includes performing one or more of a topic classification process that determines entities and intents (actions) of the input data, and outputs one or more topic NLU output parameter or dimension values, a sentiment analysis process which determines sentiment parameter value for the input data, e.g., polar sentiment NLP output parameters, "negative," "positive," and/or non-polar NLP output sentiment parameters, e.g., "anger," "disgust," "fear," "joy," and/or "sadness" or other classification process for output of one or more other NLU output parameter values, e.g., one of more "social tendency" NLU output parameter, or one or more "writing style" NLU output parameter, a tone analysis NLU output, a confusion NLU output value, and/or one or more part of speech NLU output parameter values. Part-of-speech tagging methodologies can include use of, e.g., Constraint Grammar, Brill tagger, Baum-Welch algorithm (the forward-backward algorithm) and the Viterbi algorithm which can employ use of the Hidden Markov models. Hidden Markov models can be implemented using the Viterbi algorithm. The Brill tagger can learn a set of rule patterns, and can apply those patterns rather than optimizing a statistical quantity. Applying natural language processing can also include performing sentence segmentation which can include determining where a sentence ends, including, e.g., searching for periods, while accounting for periods that designate abbreviations.

In an embodiment, the method populates a database structure with the extracted entities and actions. In this embodiment, the method analyzes the database entries to extract relationships between entities and entity actions. In this embodiment, the method constructs and stores dictionary pairs including an extracted action keyword such as juxtaposed, adjacent, etc., as an action term of the pair. The method further adds a second extracted keyword designating a node or entity associated with the action keyword. For example, the method identifies actions such as "Bastion is connected to Superior" and "Superior is connected to subordinate". In an embodiment, actions further include command line interface (CLI) commands associated with executing the tasks of the target workflow.

In an embodiment, the method passes the dictionary pairings as input to a generative model, such as a generative adversarial network (GAN). Training the GAN includes framing the problem as a supervised learning problem with two sub-models: the generator model trained to generate new examples, and the discriminator model trained to classify examples as either real (from the data domain) or fake (generated by the generator). The two models are trained together in a zero-sum game, in an adversarial manner, until the discriminator model is correct about half the time and fooled about half the time, meaning the generator model is generating plausible examples of the target output.

The two models are trained using a labeled data set of "real" images from the target domain. The generator creates an image from provided input, in this embodiment sample dictionary pairings of entities and actions and passes the generated output to the discriminator for classification. Initially the discriminator easily distinguishes generated outputs from real images from the training domain data. The generator and discriminator node weights are adjusted using gradient descent and backpropagation and the zero-sum combined loss function until images generated from input data so closely resemble images from the data domain, that the discriminator has no better than a 50-50 chance of detecting an image as generated rather than real.

After initially training the GAN, the method provides the dictionary pairs extracted from the input data as input to the GAN, which in turn, generates a graphical depiction of the extracted entities, actions and entity relationships, for user review. The GAN receives the NLP output and generates workflow depictions.

In an embodiment, the GAN generates graphical elements corresponding to the NLP extracted dictionary pairings of entities and actions. In this embodiment, the method passes the GAN outputs to a geospatial positioning function based upon a Markov Chain Monte Carlo method, such as a Hamiltonian Monte Carlo method for generating random sample arrangements of the GAN output elements for review. The random samples generated by the Hamiltonian Monte Carlo method have low levels of correlation in the target distribution space while also being otherwise correlated to each other due to the use of the GAN outputs as a common input for the function. In this embodiment, the method generates geospatial positionings of the GAN output elements using the GAN outputs. The distribution of the Hamiltonian Monte Carlo random samples converges in a distribution representative of the NLP output elements used as the inputs to the GAN. In this embodiment, selection of the geospatial positioning function output having the highest probability among the generated random samples yields an output generally representative of the input data entity-action relationships.

In an embodiment, the method provides the generated workflow depiction to the user for review. This corresponds to the action step of a reinforcement learning (RL) model. The agent of the RL model corresponds to the GAN, providing the output corresponds to the action. The user corresponds to the environment and the user feedback on the new state (i.e. the provided output) corresponds to the reward for the model. Based upon the reward received, the RL model increases or decreases the probability associated with taking the action leading to the current system state. A positive reward increases the probability while a negative reward decreases the probability of taking the action.

In this embodiment, the user provides feedback regarding one or more of the content elements generated by the GAN, the arrangement of the output elements through the user of a Markov chain Monte Carlo, or similar, random geospatial organizing function, as well as the entities and actions identified by the NLP processing of the input data and presented in the depiction of the workflow. As an example, a user may provide feedback to add a depiction of entity A, juxtaposed with entity B. For the example, the method did not originally identify this relationship for A and, but through the user feedback learns to identify such a relationship for the current data as well as future similar input data.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server subsystem 102 via network 114. Client devices 104 and 110 comprise timeseries data set selection program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the workflow depiction program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., workflow depiction generator program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
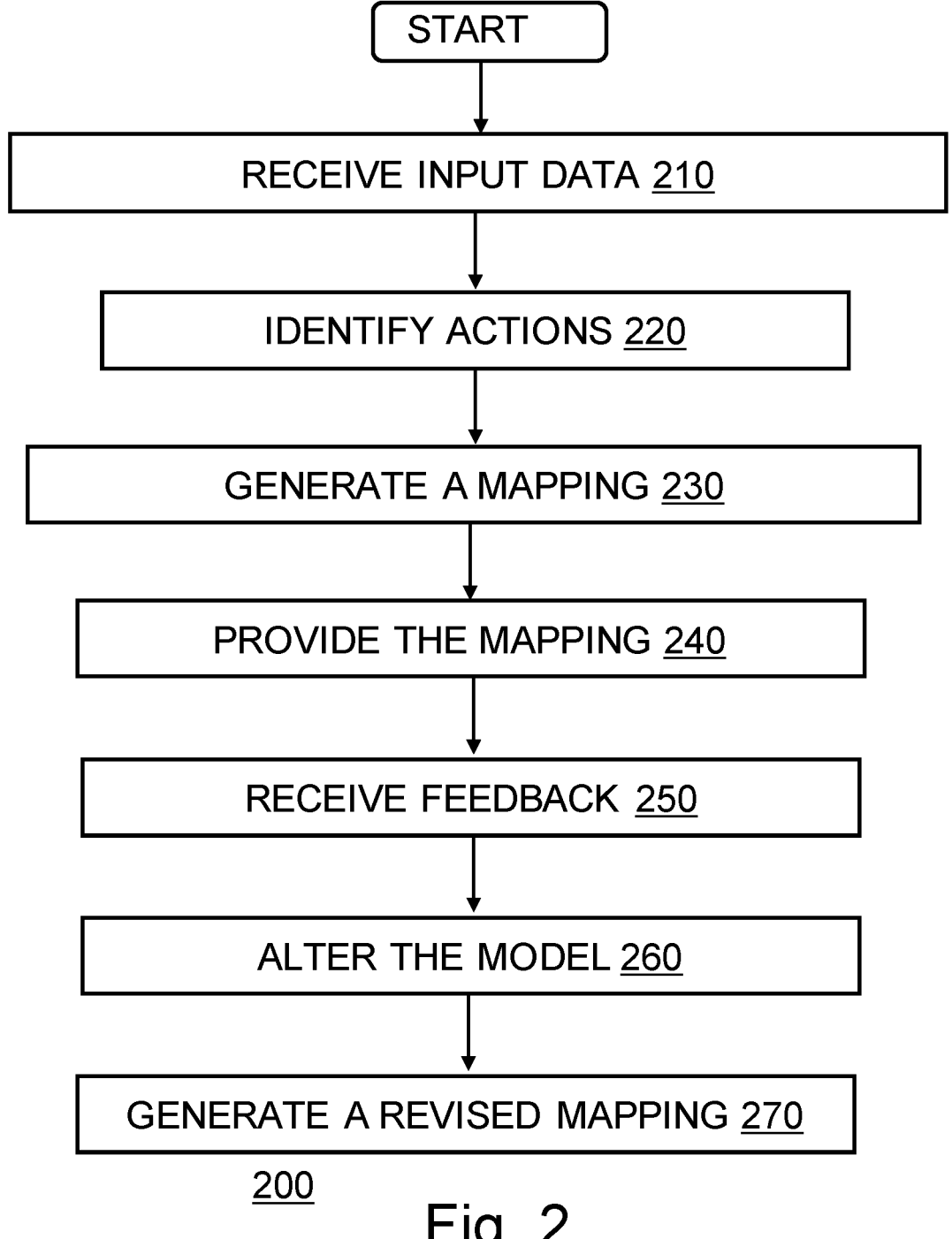
FIG. 2 provides a flowchart depicting an operational sequence, according to an embodiment of the invention.

FIG. 2 provides a flowchart 200, illustrating exemplary activities associated with the practice of the disclosure. After program start, at block 210, the method receives input data associated with the target workflow. Such input data includes text and images from workflow documentations as well as audio and text data including user comments, instructions and preferences. In an embodiment, the method performs speech to text processing of audio input data yielding additional text data for processing At block 220, the method performs natural language processing of the input data, identifying entities and associated actions within the data. The method forms dictionary pairings of entity and action keywords. The method stores the pairings of keywords in a database. The NLP further yields identification of actions including command line interface (CLI) links extracted from the input data and providing functional links to command line tasks associated with the workflow.

At block 230, the method generates a mapping of the entities and actions using a generative model including a generator such as a generative adversarial network (GAN) model. The GAN receives the outputs, from the NLP, of the input data, and generates graphical elements representative of the dictionary pairings from the NLP outputs. In an embodiment, the method passes the GAN outputs to a geospatial function, such as a Markov Monte Carlo function. The geospatial model generates random organizations of the GAN output elements. The mapping of the NLP outputs includes the entities, the related actions as well as the CLI command links extracted from the input data presented in a relationship corresponding to the entities and related actions. The CLI links embedded in the generated workflow representation comprise functional links enabling the user to proceed with implementing the workflow tasks directly from the provided workflow representation by simply clicking upon the provided CLI links. The method provides the highest probability random organization of the GAN outputs to the user as a first iteration generated workflow depiction at block 240.

At block 250, the method receives feedback from the user regarding the provided depiction. The user may provide feedback regarding the NLP extracted entities and action pairings, the organization of the GAN outputs, as well as GAN outputs themselves.

At block 260, the method alters the GAN node weightings according to positive or negative user feedback. Using reinforcement learning, the method modifies the GAN, the method increases node weightings associated with GAN outputs yielding positive user feedback and reduces node weightings yielding GAN outputs receiving negative user feedback. As an example, feedback regarding the initial depiction may indicate an incorrect relationship between entities. Entities may be disposed one above the other and feedback may indicate that the relationship should be that of one disposed adjacent and beside the other. In this embodiment, the method alters node weightings until the model generates the relationship indicated by the feedback. In another example, user feedback indicating items such as incorrect line type, arrow type, line or arrow positioning, results in node weighting changes necessary to yield the changes indicated in the user feedback.

At block 270, the method generates a new depiction using the model altered according to the user feedback. The method then presents the new depiction to the user and receives new feedback. The method iterates until generating and presenting a depiction satisfying the user.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
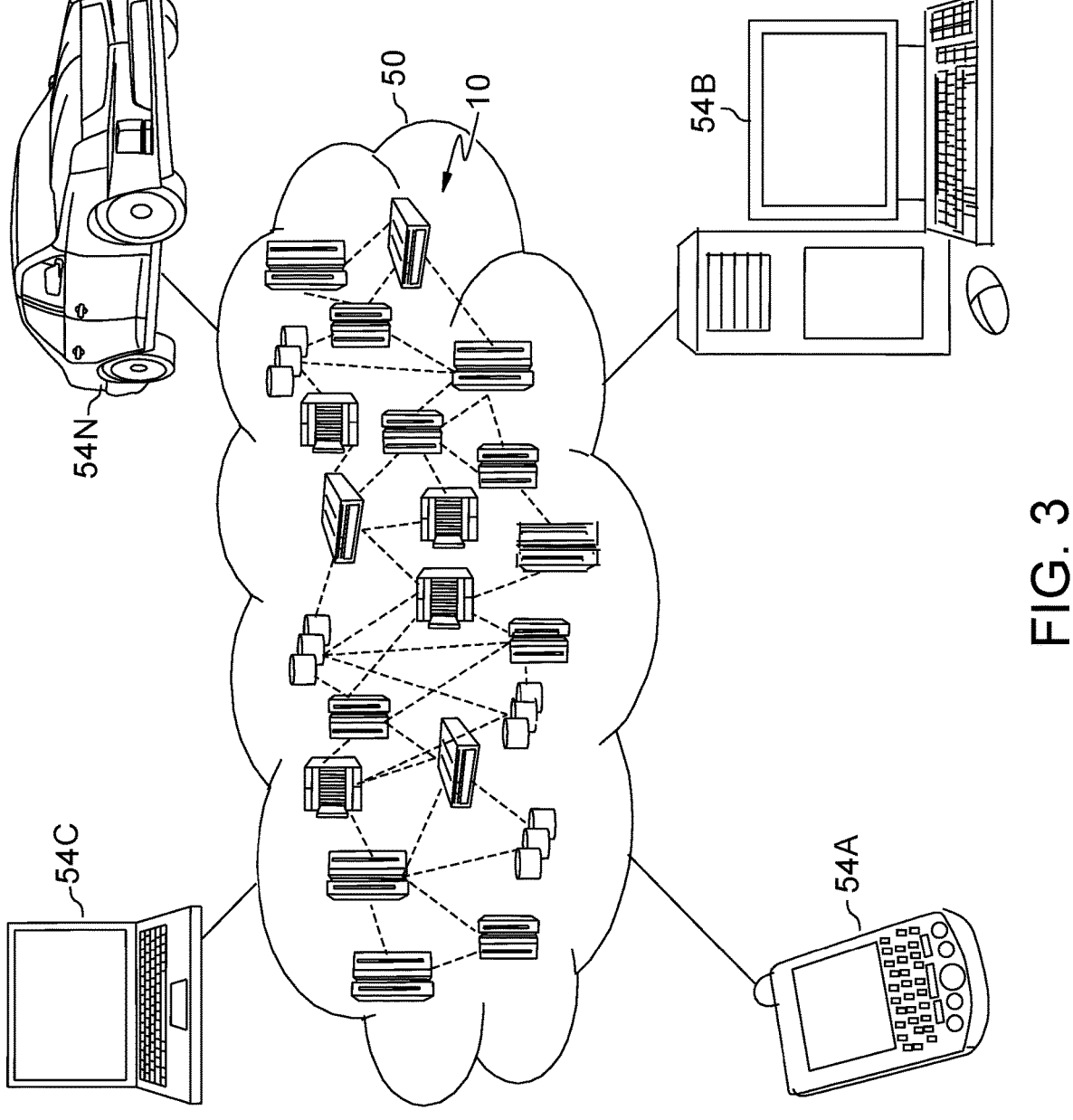
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
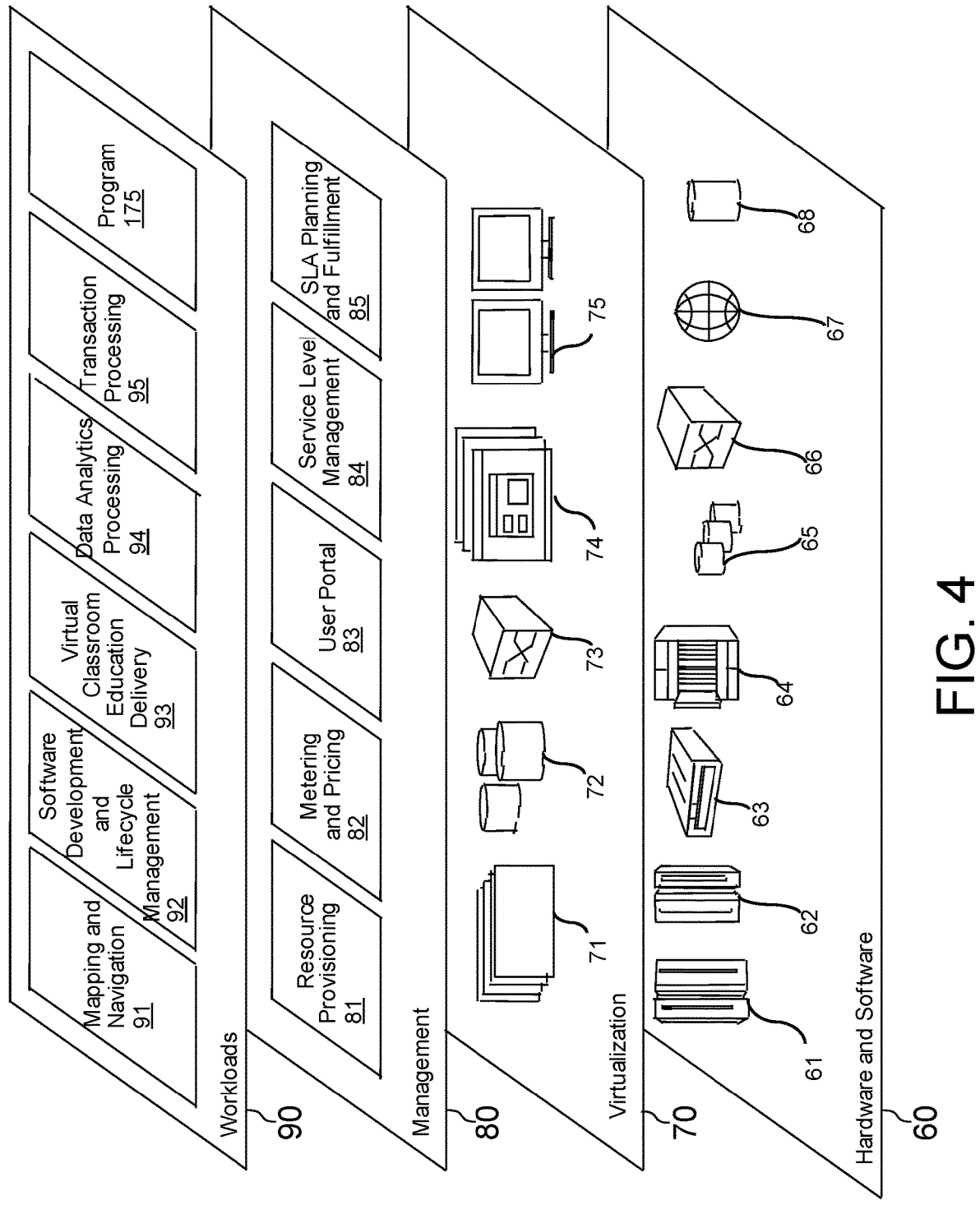
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workflow depiction generator program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for generating visual workflow representations, the method comprising:

receiving, by one or more computer processors, data including workflow documentation comprising text and audio data;

converting the audio data to text;

identifying, by the one or more computer processors, entities and actions using a topic classification process of natural language understanding (NLU) and part-of-speech tagging performed using a Hidden Markov Model with Viterbi decoding, and forming dictionary pairings of entity-action terms;

determining, by the one or more computer processors, relationships between the identified entities and actions using the NLU output, including associating each action with a corresponding command-line interface (CLI) command extracted from the workflow documentation;

generating, by the one or more computer processors, a graph from the relationships, the graph comprising nodes representing the entities and directed edges representing the actions, each directed edge being annotated with its associated CLI command;

training, by the one or more computer processors, a generative adversarial network (GAN) comprising a generator and a discriminator via gradient descent and back-propagation using labeled data from a target domain:

generating, by the GAN, graphical workflow elements corresponding to the graph;

arranging the graphical workflow elements by applying a Hamiltonian Monte Carlo (HMC) method to the graphical workflow elements and selecting a sample having a highest probability as an initial layout;

generating and providing, by the one or more computer processors, a mapping to a user, the mapping comprising the arranged graphical workflow elements with executable CLI links that, when selected by the user, invoke the associated CLI commands to implement workflow tasks directly from the mapping;

receiving, by the one or more computer processors, user feedback comprising corrections to entity-action pairings and layout attributes including adjacency, arrow type, and line type feedback from the user;

computing, by the one or more computer processors, a reinforcement-learning reward from the user feedback and altering generator and discriminator node weightings via back-propagation according to the reward; and regenerating, by the one or more computer processors, the graphical workflow elements and re-arranging the elements via the HMC sampling procedure to generate a revised mapping according to the user feedback.

2. The method according to claim 1, further comprising analyzing, by the one or more computer processors, the feedback according to a dimension selected from the group consisting of tone, sentiment, confusion, and combinations thereof.

3. A computer program product for generating visual workflow representations, the computer program product comprising one or more computer readable storage devices and collectively stored program instructions on the one or more computer readable storage devices, the stored program instructions comprising program instructions to:

receive data including workflow documentation comprising text and audio data;

converting the audio data to text identify entities and actions using a topic classification process of natural language processing (NLU) and part-of-speech tagging performed using a Hidden Markov Model with Viterbi decoding, and forming dictionary pairings of entity-action terms;

determine relationships between the identified entities and actions using the NLU output, including associating each action with a corresponding command-line interface (CLI) command extracted from the workflow documentation entities and actions;

generate a graph from the relationships, the graph comprising nodes representing the entities and directed edges representing the actions, each directed edge being annotated with its associated CLI command;

train a generative adversarial network (GAN) comprising a generator and a discriminator via gradient descent and back-propagation using labeled data from a target domain:

generate graphical workflow elements corresponding to the graph;

arrange the graphical workflow elements by applying a Hamiltonian Monte Carlo (HMC) method to the graphical workflow elements and selecting a sample having a highest probability as an initial layout;

generate and provide a mapping to a user, the mapping comprising the arranged graphical workflow elements with executable CLI links that, when selected by the user, invoke the associated CLI commands to implement workflow tasks directly from the mapping;

receive user feedback comprising corrections to entity-action pairings and layout attributes including adjacency, arrow type, and line type;

computing, by the one or more computer processors, a reinforcement-learning reward from the user feedback and altering generator and discriminator node weightings via back-propagation according to the reward; and regenerate the graphical workflow elements and re-arranging the elements via the HMC sampling procedure to generate a revised mapping according to the user feedback.

4. The computer program product according to claim 3, the stored program instructions further comprising program instructions to analyze the feedback according to a dimension selected from the group consisting of tone, sentiment, confusion, and combinations thereof.

5. A computer system for generating visual workflow representations, the computer system comprising:

one or more computer processors;

one or more computer readable storage devices; and stored program instructions on the one or more computer readable storage devices for execution by the one or more computer processors, the stored program instructions comprising program instructions to:

receive data including workflow documentation comprising text and audio data;

converting the audio data to text identify entities and actions using a topic classification process of natural language processing (NLU) and part-of-speech tagging performed using a Hidden Markov Model with Viterbi decoding, and forming dictionary pairings of entity-action terms;

determine relationships between the identified entities and actions using the NLU output, including associating each action with a corresponding command-line interface (CLI) command extracted from the workflow documentation entities and actions;

generate a graph from the relationships, the graph comprising nodes representing the entities and directed edges representing the actions, each directed edge being annotated with its associated CLI command;

train a generative adversarial network (GAN) comprising a generator and a discriminator via gradient descent and back-propagation using labeled data from a target domain:

generate graphical workflow elements corresponding to the graph;

arrange the graphical workflow elements by applying a Hamiltonian Monte Carlo (HMC) method to the graphical workflow elements and selecting a sample having a highest probability as an initial layout;

generate and provide a mapping to a user, the mapping comprising the arranged graphical workflow elements with executable CLI links that, when selected by the user, invoke the associated CLI commands to implement workflow tasks directly from the mapping;

receive user feedback comprising corrections to entity-action pairings and layout attributes including adjacency, arrow type, and line type;

computing, by the one or more computer processors, a reinforcement-learning reward from the user feedback and altering generator and discriminator node weightings via back-propagation according to the reward; and regenerate the graphical workflow elements and re-arranging the elements via the HMC sampling procedure to generate a revised mapping according to the user feedback.

6. The computer system according to claim 5, the stored program instructions further comprising program instructions to analyze the feedback according to a dimension selected from the group consisting of tone, sentiment, confusion, and combinations thereof.

\* \* \* \* \*